(12) United States Patent
Khade et al.

(10) Patent No.: US 11,708,686 B2
(45) Date of Patent: Jul. 25, 2023

(54) METHOD, SYSTEM, AND APPARATUS FOR THE ELECTRO CONDUCTIVE EXTRACTION OF WATER MOLECULES FROM THE AIR

(71) Applicant: AtmoSpark Technologies, Inc., Beaumont, TX (US)

(72) Inventors: Aniket Khade, Beaumont, TX (US); Tejus Mane, Houston, TX (US)

(73) Assignee: AtmoSpark Technologies, Inc., Beaumont, TX (US)

( * ) Notice: Subject to any disclaimer, the term of this patent is extended or adjusted under 35 U.S.C. 154(b) by 596 days.

(21) Appl. No.: 16/633,256

(22) PCT Filed: Jul. 26, 2018

(86) PCT No.: PCT/US2018/043979
§ 371 (c)(1),
(2) Date: Jan. 23, 2020

(87) PCT Pub. No.: WO2019/023513
PCT Pub. Date: Jan. 31, 2019

(65) Prior Publication Data
US 2020/0240123 A1    Jul. 30, 2020

Related U.S. Application Data

(60) Provisional application No. 62/538,216, filed on Jul. 28, 2017.

(51) Int. Cl.
*E03B 3/28* (2006.01)
*B01D 5/00* (2006.01)

(52) U.S. Cl.
CPC ............... *E03B 3/28* (2013.01); *B01D 5/009* (2013.01); *B01D 5/0015* (2013.01); *B01D 5/0042* (2013.01); *B01D 5/0051* (2013.01)

(58) Field of Classification Search
None
See application file for complete search history.

(56) References Cited

U.S. PATENT DOCUMENTS

| | | | | |
|---|---|---|---|---|
| 5,056,593 | A * | 10/1991 | Hull | F28B 1/02 165/111 |
| 6,266,962 | B1 * | 7/2001 | Ghoshal | F25B 21/02 62/3.3 |
| 7,887,622 | B1 * | 2/2011 | Turner, Jr. | B01D 5/0042 62/3.4 |
| 2001/0029842 | A1 * | 10/2001 | Hoenig | B03C 3/16 96/63 |

(Continued)

*Primary Examiner* — Christopher P Jones
*Assistant Examiner* — Phillip Y Shao
(74) *Attorney, Agent, or Firm* — Lewis & Reese, PLLC

(57) ABSTRACT

An apparatus, system, and method for the extraction of water molecules from the air includes a combination of electrical mechanisms and materials engineering. With the help of hydrophobic and hydrophilic materials on an array of thermally conductive and electrically insulated materials, the extraction of water from the air is significantly increased. A combination of hydrophobic and hydrophilic materials and an electric field gradient moves the water molecules towards the collection system thus speeding up the water formation process. This also inhibits the re evaporation of the water droplets.

19 Claims, 7 Drawing Sheets

(56) References Cited

U.S. PATENT DOCUMENTS

| | | | |
|---|---|---|---|
| 2002/0011075 A1* | 1/2002 | Faqih | C02F 9/005 |
| | | | 62/285 |
| 2003/0150483 A1* | 8/2003 | Max | B01D 5/0033 |
| | | | 136/291 |
| 2005/0097901 A1* | 5/2005 | Hutchinson | E03B 3/28 |
| | | | 62/93 |
| 2007/0295021 A1* | 12/2007 | Tyls | E03B 3/28 |
| | | | 62/317 |
| 2010/0212348 A1* | 8/2010 | Oh | B01D 53/323 |
| | | | 165/104.31 |
| 2012/0073320 A1* | 3/2012 | Seoane | B01D 5/0015 |
| | | | 62/291 |
| 2014/0287150 A1* | 9/2014 | Miljkovic | B01D 5/0042 |
| | | | 427/458 |
| 2016/0145838 A1* | 5/2016 | Turner, Jr. | B01D 5/0015 |
| | | | 62/3.4 |
| 2017/0167120 A1* | 6/2017 | Sarikaya | E03B 11/10 |

* cited by examiner

METHOD, SYSTEM, AND APPARATUS FOR THE ELECTRO CONDUCTIVE EXTRACTION OF WATER MOLECULES FROM THE AIR

PRIORITY/CROSS REFERENCE TO RELATED APPLICATION

This application claims priority to Provisional Patent Application number U.S. 62/538,216 entitled "Method, System, and Apparatus for the Electro Conductive Extraction of Water Molecules from the Air" by Tejus Mane and Aniket Khade filed on Jul. 28, 2017. That application is incorporated by reference in its entirety.

FIELD OF THE INVENTION

The present invention relates to devices that extract water vapor from ambient air, and specifically improves upon devices that use electrostatic principles for removing water vapor from the air without the consumption of large amounts of energy and without the requirement for the device to contain an initial amount of water.

BACKGROUND OF THE INVENTION

Ambient humid air contains water vapor, making the atmosphere a potential water source accessible to everyone. Under normal conditions, a cubic kilometer of ambient humid air contains over three million gallons of potable water, which can supply water for five million people. Ambient humid air in coastal areas is constantly renewed by ocean winds, which makes it a virtually limitless source.

Technology for atmospheric water generation has primarily been concerned with the reduction of water vapor from the air for air conditioning. These dehumidifier systems are not designed to maximize water production, but rather to remove enough humidity to satisfy air conditioning requirements. There is now an impetus to develop technologies that maximize the water output from such a process.

A goal of atmospheric water collectors has been to maximize water extraction while reducing the energy requirements. The main principle of water extraction is condensation of air to the local dew point temperature, causing the liquid water to condense out of the air. Refrigeration systems commonly apply compression and expansion cycles to reach temperatures below dew point, condensing the water vapor in the air that passes through the refrigerated elements. The process of compression in such systems is energy intensive, making the application limited for extraction of water.

An issue with atmospheric water generation is refrigeration. Many systems used in atmospheric water generation require coolant, usually water, to generate water. Known technologies for producing water and dehumidifying air rely on electrostatic dehumidification of air but also requires a certain amount of 'seed' water to start extracting water. This creates a system where water is needed before more water may be generated. The requirement of water as a cooling mechanism to generate water can be a problem in communities without water reserves. Other cooling methods to maximize the efficiency of water extraction are also needed.

Another common technique to extract water vapor is the use of absorption or adsorption by a chemical desiccant material or a hygroscopic material. The material becomes saturated with water, after which the material must be regenerated by heating it up to release the trapped water after which the water can be condensed. The process of regeneration is a mechanically complex system and requires a significant amount of energy.

An alternate technique to extract water from the air is to attract water vapor from air due to the polar nature of water molecules. Electrostatic collection techniques use the dipole moment in a water molecule to attract water towards a charged object where the water condenses. Although the dipole gradient force of the water molecule is weak, the electrostatic force due to the acquired charge on the molecule allows it to react in an electric field. Electrostatic devices are commonly used to attract charged particles such a pollutants and particulates from the air in industrial chemical processes as well as in certain air conditioning systems. The use of electric fields for water extraction has not been commonly applied technique and there has been minimal exploration in this area to commercialize such a technology. Additionally, the field of electrostatics as a method of water extraction has had limited success in terms of the quantity of water produced for large-scale applications.

Another issue with potable water is distribution. Water needs an existing infrastructure to get from where it is collected to where it is finally needed, such as a residence. In areas where wells are not viable, water must be transported in either by truck or pipeline. In some areas, there may be only a limited window of opportunity to get water during a given time.

Given these issues with both water collection and transportation of water to those who need it, the need exists for a water collection mechanism that generates the water in usable quantities at the location it is needed, removing the need to have it transported to the needed location.

BRIEF SUMMARY OF THE INVENTION

Briefly described in one embodiment thereof, the present invention provides a system, device, and method for extracting water from the air. It is therefore an object of the invention to provide a condensation focus device that removes water vapor from the air without the need of energy intensive cooling system or chemical desiccants. The present invention improves upon the electrostatic approach of water extraction from humid air using the combination of an improved process and a material-based approach. It is yet another object of the present invention to provide an energy efficient apparatus that removes water from the air without requiring an initial amount of water to cool or seed the system.

In an exemplary embodiment, water is extracted from the air using a condensation focus device that creates an electrical field that promotes the condensation of water.

In another exemplary embodiment, water is collected by applying a voltage through a condensation focus device with a hydrophilic surface and collecting water from said condensation focus device.

Alternatively, in another embodiment of the apparatus, the condensation focus device can contain a channel, which allows for the provision of intensive cooling mechanism, such as refrigerants, to increase the efficiency of cooling which is required industrial scale operation or marine operations.

In an alternative exemplary embodiment, a water extraction system includes an air input port, a vessel containing an inward radial array of angled condensation focus devices which are connected to a voltage source, an airflow path through the vessel, central coaxial electrode that is grounded, and an air output port. A refrigeration system may be used, but is not required. A frequent element of a cooling system is water. Removing the requirement of an initial amount of water also reduces the mechanical complexity required of the water extraction system.

In another exemplary embodiment, a water extraction system uses a condensation focus device, an electrical ground, a case with an inner shell, outer shell, air input and air output, where water collects on a condensation focus device.

In another exemplary embodiment of the system, the condensation focus device may be physically connected to a cooling mechanism such as thermoelectric coolers, which can maintain temperature of the condensation focus device for maximizing condensation. The thermoelectric coolers can be integrated into the overall control system of the system.

In another exemplary embodiment of the system, air may be forced into the inner shell, increasing the air pressure and lowering the amount of energy needed for condensation.

In another exemplary embodiment of the system, the input port has an electrostatic filter attached to it. In a further exemplary embodiment of the system may contain an air movement device which may be a fan or a vacuum pump.

In a further exemplary embodiment, water vapor is extracted from the air by exposing the air to a surface with an electrical field. The resulting electrical field promotes the formation of water on the surface. Various methods may be used to enhance the effectiveness of the water formation, including but not limited to a hydrophilic surface, use of non-water based cooling apparatus, and use of a control system to adjust local air properties (such as local air pressure) to promote water condensation.

DETAILED DESCRIPTION OF THE INVENTION

Figure 3:
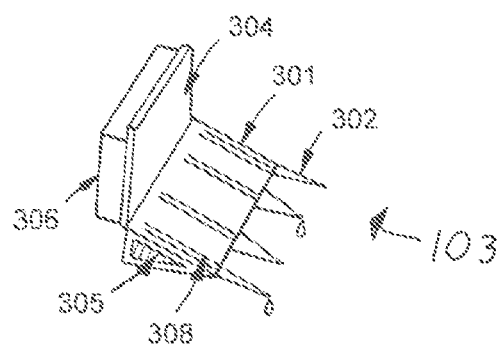
FIG. 3 is a perspective view of the condensation focus device.

FIG. 3 depicts the perspective view of the condensation focus device 103 that is made up of a plate 301 that has a rectangular surface in the exemplary embodiment, but alternative embodiments may be in any shape. The material of the plate 301 is conductive and connected to a voltage source, and has a material strength and corrosion resistance in an expansive range of temperatures and pressures. Pointed tips 302 are attached to edge of the plate 301, which can be either welded or fastened together using an electrically conductive material such as copper in an exemplary embodiment. The plate 301 and the tips 302 may be made of copper, brass, nickel, aluminum, steel, stainless steel or an alloy with similar properties. On the other end of the plate 301 opposite from the tips 302 is a vertical panel 304 that can be either be a separate element or fabricated from the same piece of metal as the plate 301. The vertical panel 304 may be of a thermally conductive material to rapidly cool the condensation focus device 103. The cooling element 306 is coupled to the vertical panel 304, which in turn removes heat from the condensation focus device 103. The use of cooled vertical panel 304 lowers the energy required for condensation for water in the air. The vertical panel 304 is also electrically insulated (not shown) from the cooling element 306 to avoid electrifying the cooling element 306. In an exemplary embodiment, the cooling element 306 is a thermoelectric/peltier cooler.

While the cooling element 306 is shown for simplicity, it may be substituted for cooling devices 102 such as cooling fans, heat sinks, or any other temperature regulation mechanism that can accomplish substantially the same function. These maybe used interchangeably as they accomplish substantially the same purpose and are within the scope of the invention. Cooling devices 102 may be used to supplement the work of cooling elements 306.

The plate 301 in an exemplary embodiment is made of hydrophilic or super hydrophilic material or a type of surfactant coating, which will reduce the surface tension of water that accumulates on the plate 301. Alternatively, it may be etched with a type of microgroove pattern. The hydrophilic material on the plate 301 lowers the surface energy for the water to condense and spreads the water across the entire surface of the plate 301, which creates conditions favorable for condensation due to polar nature of water. The hydrophilic surface of the plate 301 also ensures that the energy of evaporation is at its maximum due to the attraction of the water on the plate 301, thus minimizing the amount of condensed water reevaporating in the air.

In an alternative embodiment, the plate 301 can be etched with nanoparticles to act as nucleation points for the water molecules in the air to condense on the plate 301. As the diameter of the water molecules are in the nanometer-micrometer size range, this helps in enhancing condensation of further water droplets on the surface of the plate 301 by using the already formed nano droplets as a point of condensation until they reach a critical mass to form a full water droplet.

In an exemplary embodiment, the plate 301 is connected to a voltage source higher than 5 kV and draws minimum amperage. The electric field emanating from the condensation focus device 103 directs the polar water molecules toward the tip 302, which in turn clusters water molecules together, further lowering the surface energy required for condensation. This creates an optimum condition for water condensation. Additionally, grooves 308 that are engraved on the plate 301 further direct the water towards the pointed tip 302. The tips 302 also form a gradient for the electric field, which in turn pulls the charged water towards the tip 302. In an exemplary embodiment, it is the material combination of the hydrophilic plate 301 and the hydrophobic tip 302 along with the electric field effect that lowers the minimum energy required for condensation.

The water reaches the tips 302 where it coalesces to form bigger drops until it reaches critical mass to drop. In order prevent the wetting of tips 302 and ensure drop formation, the tips 302 are made of or coated with hydrophobic or super hydrophobic material. The hydrophobic nature of the tips 302 allow for the increase in liquid-liquid interaction making it favorable for the water to coalesce similar to the 'lotus effect' where the water balls up. In another embodiment of the condensation focus device 103, the plate 301 can contain a channel 305 through which a refrigerant can be circulated as shown in FIG. 3.

The added advantage of the plate 301 and tips 302 is the elimination of bacterial/live biological material due to the high voltage charge stored on the surface of the plate 301. This aids in reducing the intensity of the filtering process later.

Figure 1A:
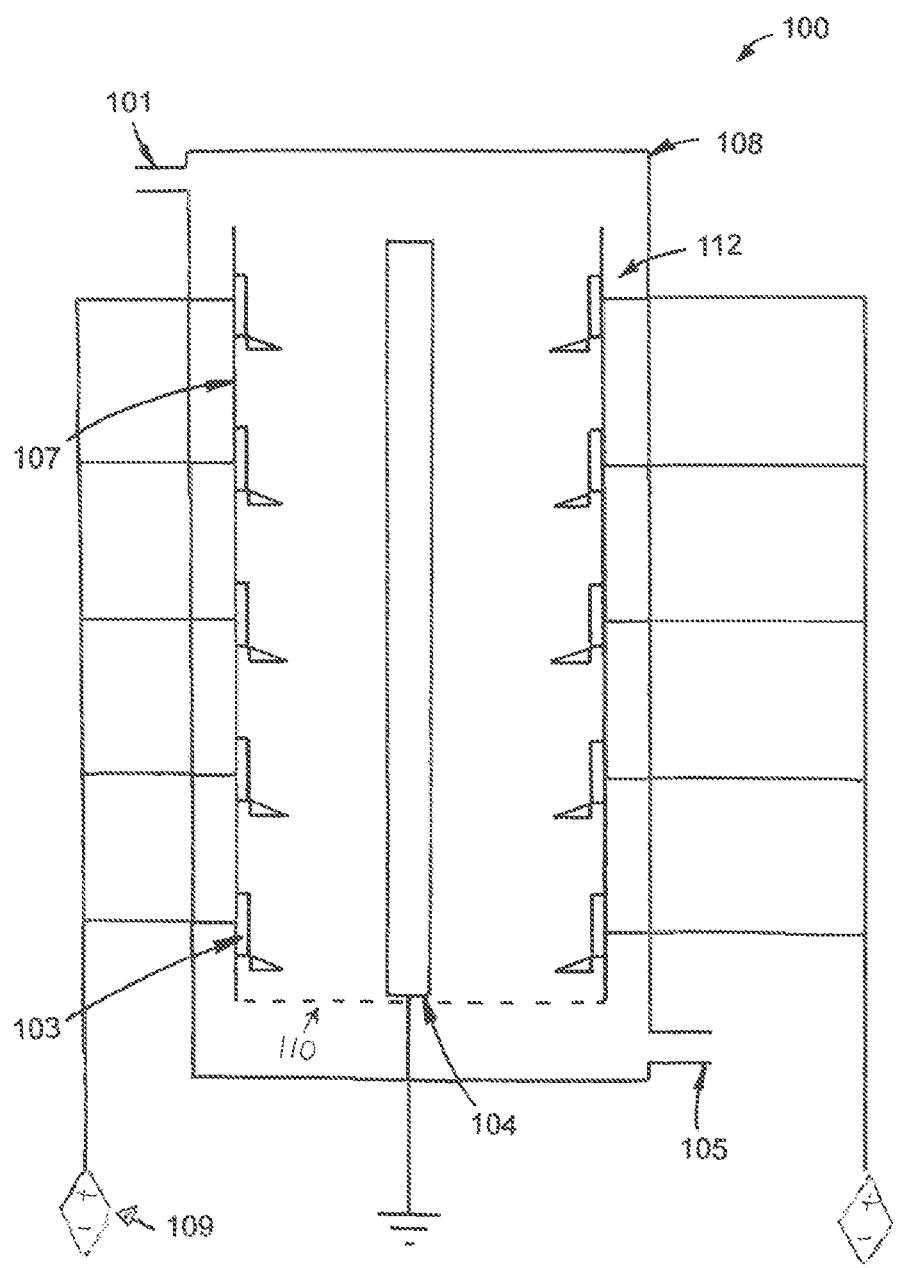
FIG. 1a is the cross-sectional view of an exemplary embodiment of a system without control devices with an inner shell nested in an outer shell using a grounding rod and conduction focus devices.

FIG. 1a depicts the cross-sectional view of an exemplary embodiment of a water generator 100 with condensation focus devices 103 for extracting water from the air. The outer casing 108 covers all the internal components of the water generator 100, while the condensation focus devices 103 (ten in the exemplary embodiment in FIG. 1a, but only one labeled for clarity) and associated components reside in the inner shell 107. The outer casing 108 in an exemplary embodiment is made of insulating materials such as thermoplastics or similar polymers to avoid the buildup of voltage on the surface of the outer casing 108. The inner shell 107 can be made of structurally strong and corrosion resistant material such as nickel or steel. The electrical systems may be housed in the inner annulus 112 between the inner shell 107 and the outer casing 108. In an exemplary embodiment, the inner annulus 112 contains an electrically grounded shielding material such as a copper screen. This would allow for electromagnetic shielding between the electrical components of the water generator 100 and outer casing 108 to avoid effects of electric field outside of the internal shell 107.

Figure 2:
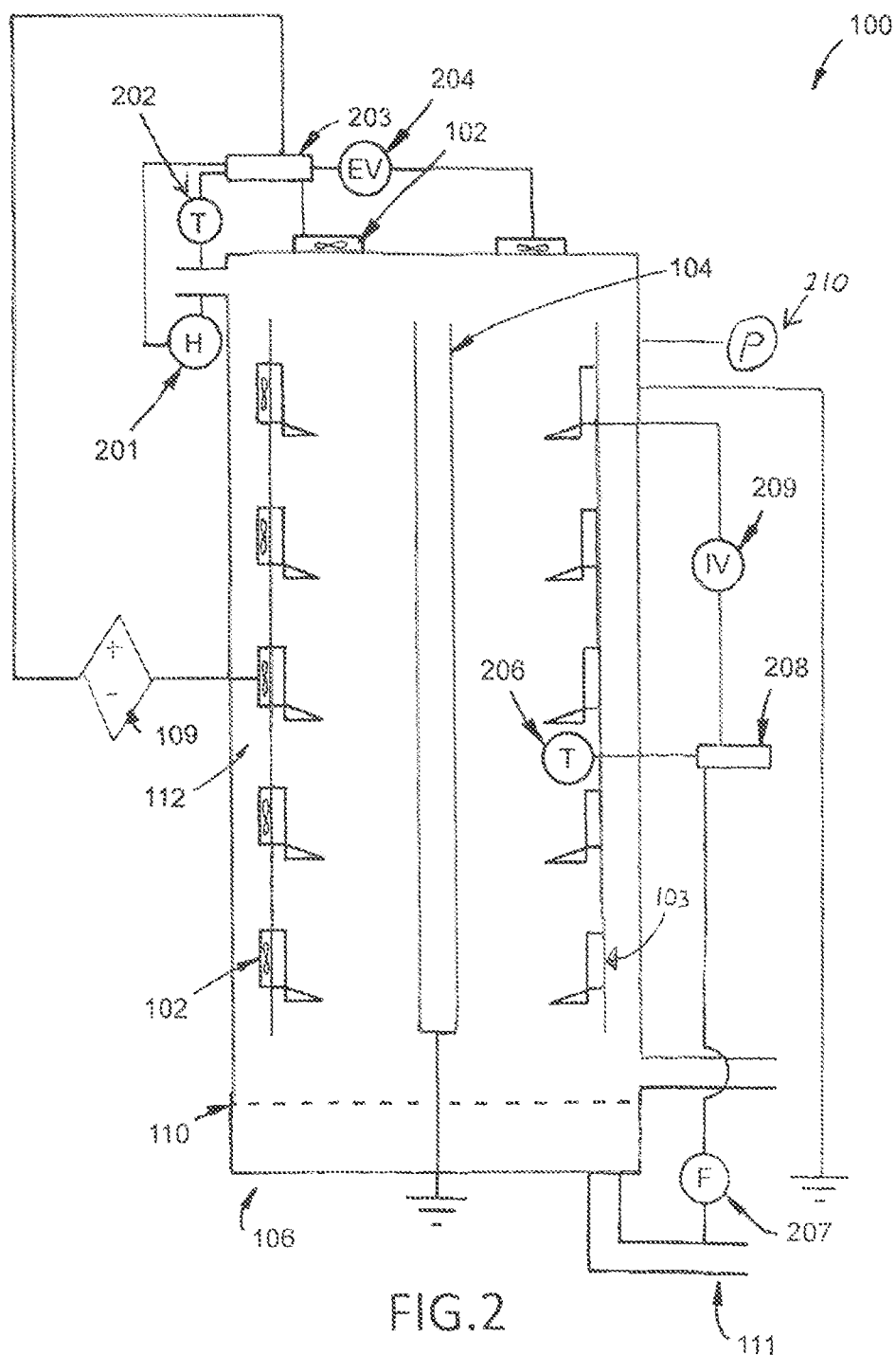
FIG. 2 is control scheme layout of the exemplary embodiment of FIG. 1a using a series of control devices with a location for water collection.

The water generator 100 contains an input port 101 to access ambient air and an output port 105 from which the air exits the water generator 100. While the exemplary embodiment shows the input port 101 and the output port 105 on the side of the water generator 100, it may also be on the any surface without departing from the scope of the invention. The water generator 100 contains of an arrangement of condensation focus devices 103 as was previously discussed that are connected radially inwards along the inner shell 107. The condensation focus devices 103 maybe angled towards the bottom of the water generator 100 for gravity to act as an additional force to enhance wetting of the plate 301 and coalescence on the tip 302 to speed of the precipitation of water. The inner shell 107 allows for structural stability to hold the condensation focus device 103 as well as support the grounding rod 104. The inner shell 107 also allows for the connections to attach additional cooling devices 102 as shown in FIG. 2.

Within the inner shell 107, condensation focus devices 103 are influenced by the grounding rod 104, creating an electrical field. The grounding rod 104 provides a path to electrical ground to create a means of directing the electric field from the plate 301 towards the pointed tips 302 on the condensation focus device 103. In another embodiment of the invention, the grounding rod 104 can be connected to a negative potential source relative to the condensation focus device 103.

The voltage source 109 for the water generator 300 may be DC or AC depending on the source of power or the type of transformer used in the system. In an exemplary embodiment, the voltage source 109 is represented using a generic DC power source that generates a minimum of 3 kV. For AC voltage sources, the condensation focus device 103 may be modified by changing the materials that can build charge with AC voltage. The system voltage source 109 can be modified to a pulsed voltage output to create a pulsed electric field for use in industrious environment where flammable chemicals might enter the air stream inside the water generator 100.

Figure 6:
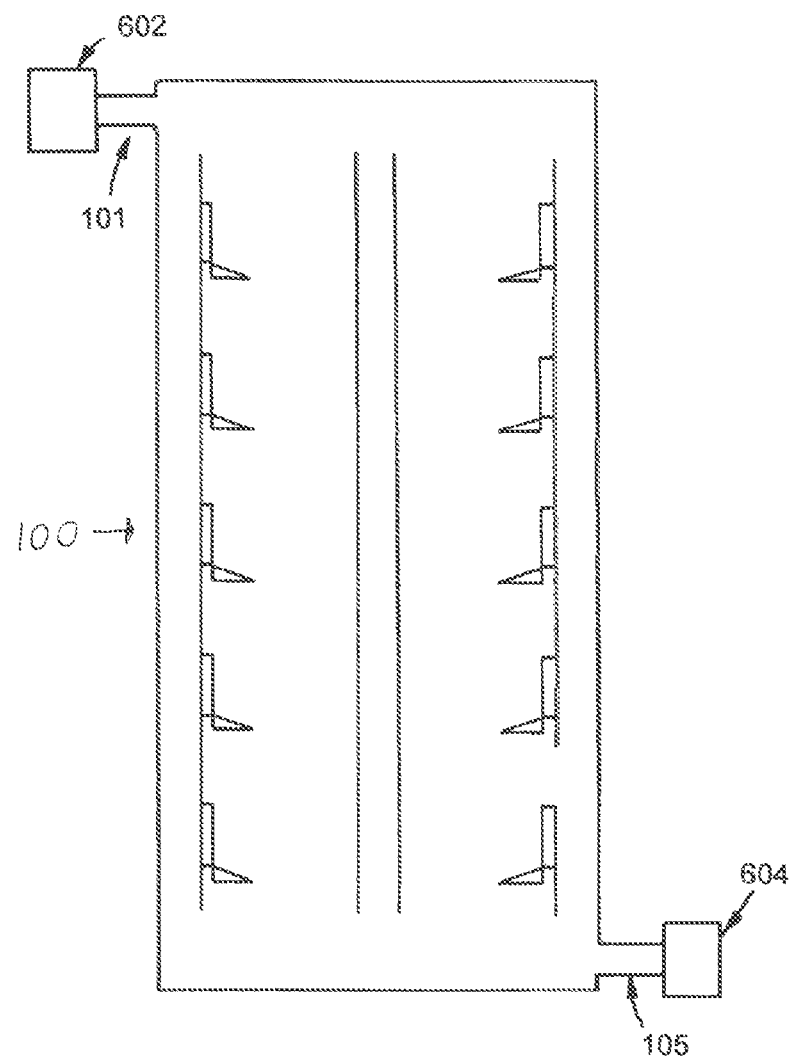
FIG. 6 is a simplified cross sectional view of the system from FIG. 1a with both a fan and a vacuum pump.
Figure 7:
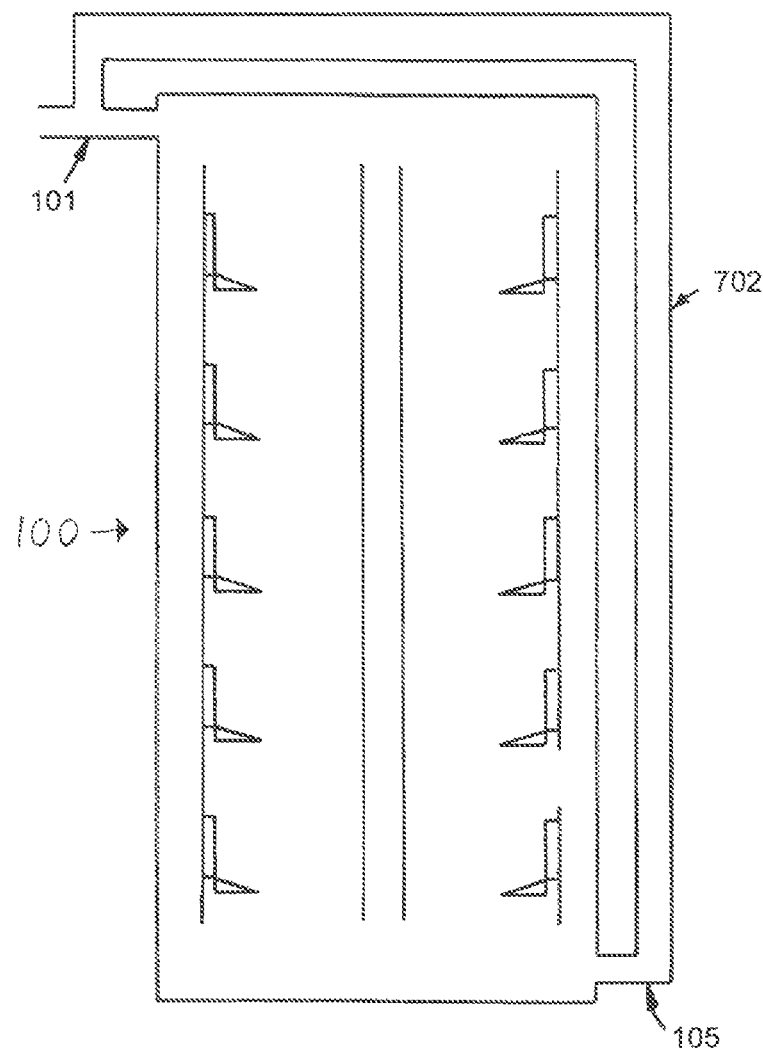
FIG. 7 is a simplified cross sectional view of the system from FIG. 1a with an air recirculation system.

In an alternative embodiment, the air may enter the water generator 100 through use of an air movement device, such as an input fan 602 in communication with the input port 101 as shown in FIG. 6. Air may also be moved through the apparatus by a vacuum pump 604 shown in FIG. 6 attached at the output port 105 as an alternate means of directing airflow. The input fan 602 and the vacuum pump 604 may be used together or individually. In a further alternative embodiment, the output port 105 can be attached to a recirculator 702 which can send the air back to the input port 101 as shown in FIG. 7 for maximum extraction of water from air such as in applications where the requirement for dry air is crucial. In an alternative embodiment, the water generator 100 can recirculate air exiting the system through output port 105 which help in removing the heat generated by the cooling device 102 as well providing the system and for maximum extraction of air such application where the requirement for dry air is crucial as shown in FIG. 7. Additionally, the recirculated air may be used to cool the heat sinks used as cooling devices 102 coupled to the condensation focus systems 300.

Additionally, the ambient air maybe pre-cooled using an optional cooling device 102. An example would be a thermo electric cooler. In the exemplary embodiment of the water generator 100 depicted in the drawings, thermoelectric air coolers such as AC-055 CP by TE TECHNOLOGY INC represent the cooling device 102.

Figure 5:
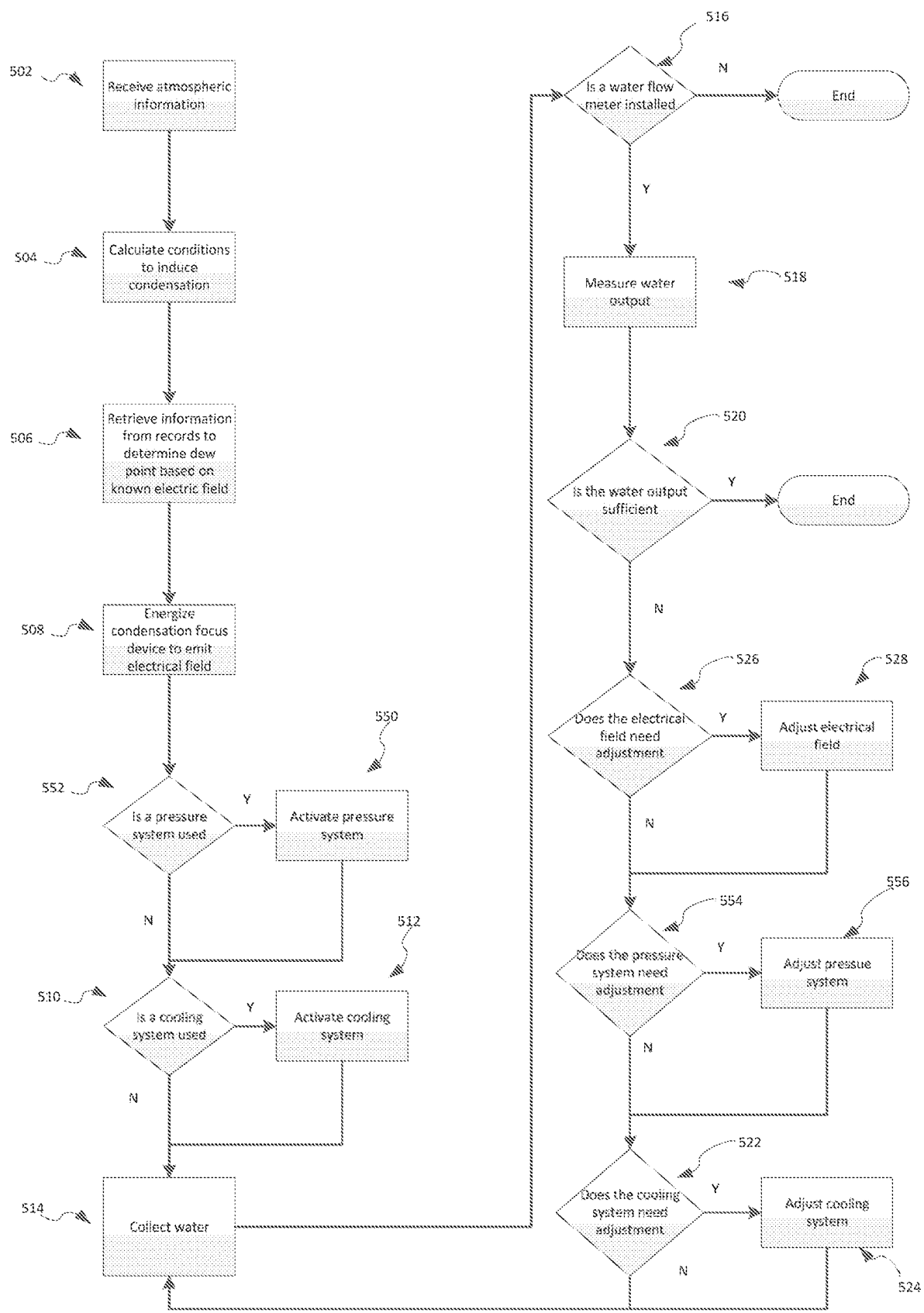
FIG. 5 is a flowchart of an exemplary embodiment of the control scheme logic that may be integrated into the apparatus for extraction of water from the air.

FIG. 2 represents the configuration of the water generator 100 including the control systems that are detailed in the flowchart of the control strategy in FIG. 5. The exemplary embodiment uses a fan as a cooling device 102 for the whole water generator 100. In an alternative embodiment, each condensation focus device 103 may have its own cooling device 102 and the inner annulus 112 contains heat pumps, heat sinks, or any other cooling mechanism known to those skill in the art. The humidity sensors 201 and temperature sensors 202 are used to monitor ambient relative humidity and temperature of the incoming air stream in the input port 101 and send a signal to an external monitor logic device 203 that processes and calculates the optimum internal temperature for the water generator 100. The external monitor logic device may be a feedback/feed forward controller such a PID controller or a series of controllers and logic gates. The external monitor logic device 203 sends the appropriate output to the external voltage controller 204 to set the new temperature in the water generator 100 with the cooling mechanism. Pressure inside the water generator 100 is monitored by a pressure sensor 210.

The external monitor logic device 203 may also be configured to command an air movement device in an alternative embedment, such as the type in FIG. 6 with an input fan 602 and vacuum pump 604. Similarly, an internal temperature sensor 206 and flow meter 207 may be connected to an internal monitor logic device 208 that determines the best voltage to set the condensation focus devices 103 at for maximum output. The internal monitor logic device 208 then sends the output to internal voltage controller 209 to set the new voltage of the condensation focus devices 103.

The flowchart of the control strategy shown in FIG. 5 will be employed the by the external monitor logic device 203 and the internal monitor logic device 208 for determining the optimal conditions required in the water generator 100, as well conserving the amount of energy used. A humidity sensor 201 and temperature sensor 202 collect atmospheric data used to determine ambient air relative humidity and temperature (step 502). The information is then transmitted to the external monitor logic device 203 that calculates the dew point temperature required for condensation of water at that temperature and relative humidity (step 504). The external monitor logic device 203 then determines the appropriate electric field level based on a set of testing data to lower the dew point on the condensation focus device 103 to induce water collection (step 506). The condensation focus device 103 is energized to emit an electrical field (step 508). If the process includes a pressure system (step 552), then the external monitor logic device 203 will determine the optimum pressure, which will be higher than the pressure in the water generator 100. The external monitor logic device 203 will send the appropriate signal to modify the pressure of the pressure system (step 550). If the process includes a cooling system (step 510), then the external monitor logic device 203 will determine the actual dew point temperature, which will be higher than the psychometrically determined dew point temperature on the energized condensation focus device 103. The external monitor logic device 203 will send the appropriate signal to modify the temperature of the cooling system (step 512). Water is then collected (step 514).

With the process started, a flow meter 207 (if installed) can monitor output of the system (step 516). The water collection system in the water generator 100 records the water output in the collection system by a flow meter 207 or appropriate sensor system (step 518). If the water output is sufficient (step 520), then the settings remain at their current levels. If the water output is insufficient, the internal monitor logic device 208 combines the signals from the internal temperature sensor 206, the pressure sensor 210, and the flow meter 207 to determine what needs to be adjusted. If the electrical field needs to be adjusted (step 526), then the voltage required to generate the required electric field is adjusted (step 528), and the process continues. If the pressure of the system needs to be adjusted (step 554), then the pressure level is altered (step 556) and the process continues. This may be accomplished by any means know to those skilled in the art, including altering the speed of an input fan 602. If the cooling of the system needs to be adjusted (step 522), then the cooling level is altered (step 524). This may be accomplished by any means know to those skilled in the art, including increasing power to cooling devices 102 and or the cooling elements 306. The adjustment of any of these systems decrease the energy of condensation, allowing water to condensation.

In an exemplary embodiment with a relative humidity above 70%, the methodology in FIG. 5 is used primarily to save energy needed for cooling systems and maximize water output, which can save costs in industrial applications and residential applications.

While the above disclosed methodology shows one exemplary embodiment, it is understood that they may be rearranged in any order. Further, items that enhance the effectiveness of the condensation focus devices 103 may be added or deleted and still fall within the scope of this disclosure.

Multiple water generators 100 can be put together as modules of a larger water generation system that allow for redundancy in case if one of the water generators 100 fails or stops working. The external monitor logic device 203 can be used to run the redundant modules in case any of the active ones fail to keep the continuous generation of water in critical locations.

Figure 1B:
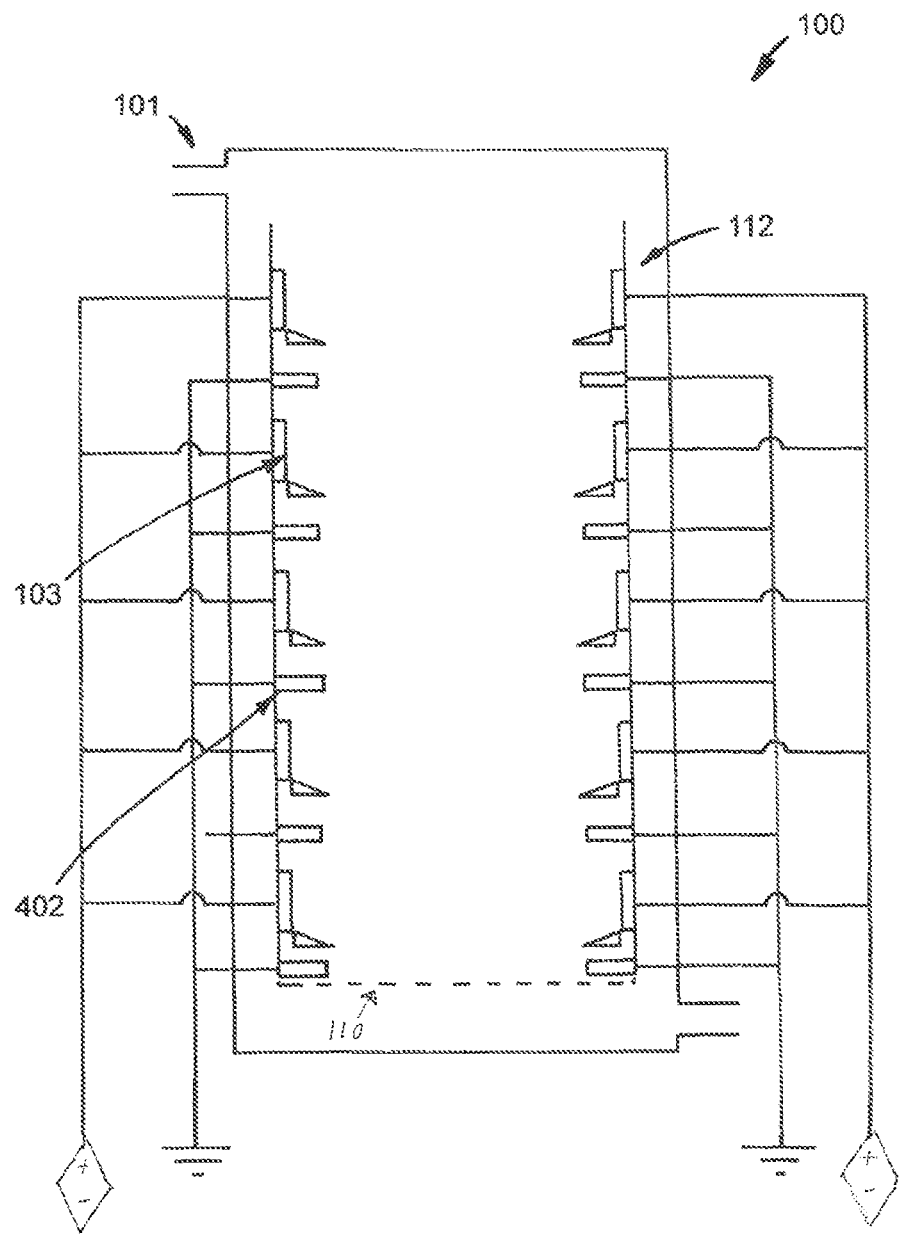
FIG. 1b is the cross-sectional view of an exemplary embodiment of a system without control devices with an inner shell nested in an outer shell using a series of grounding plates and condensation focus devices.
Figure 4:
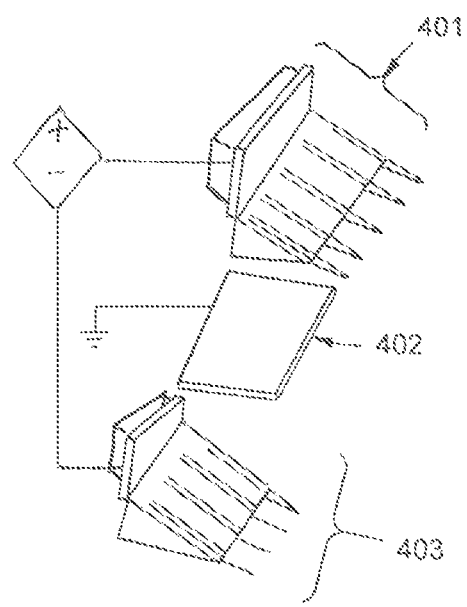
FIG. 4 is a perspective view of the condensation focus device with an optional ground plate arrangement.

FIG. 4 shows another embodiment of the condensation focus devices 103 in which the grounding mechanism is not a ground rod 104 but rather a grounding plate 402 that is placed above and in between condensation focus devices 401 and 403. An alternative exemplary embodiment shown in FIG. 1b may use this modification in a compact version of the water generator 100 in which mechanical integrity of the overall water generator 100 is not a crucial factor, such as if the water generator 100 is being supported by a person or mounted on vehicle. The grounding plates 402 are above the condensation focus devices 403 to create the correct electrical field. The grounding plates 402 may be solid piece of material or a mesh. The grounding plates 402 are dimensioned to allow water to drop form the condensation focus devices 401 above the grounding plate 402 without obstruction.

In addition to the elements to extract water from the air, the water generator 100 contains a collection container 106 to store the water as shown in FIG. 2. The collection container 106 has a porous or mesh lid 110 to reduce reevaporation of the extracted water. The collection container 106 may be connected to a pipe 111 that can be used to connect the water generator 100 to another water storage device, a filtration device, or provide water to an internal plumbing system.

In an alternative embodiment, the water generator 100 can be modified in design to increase the pressure of the system by compressing the air flowing into the water generator 100 at a higher rate which can build the internal pressure inside the water generator 100. This increase in internal pressure in this embodiment would change the dew point, reducing the intensive cooling required by the condensation focus device 103, which in turn can reduce the overall energy footprint of the entire water generator 100 as well as increase the rate of condensation on each individual condensation focus device 103.

It will be understood that while the above disclosed embodiment used an external monitor logic device 203 and an internal monitor logic device 208, these functions may be combined by a single logic device, such as a multipurpose computer programmed to act as the previously described logic devices. It is also understood that any references to electrical voltage, amperage or other electrical properties are illustrative only and are in no way limiting.

One of skill in the art will appreciate that the above disclosed embodiments provide improved water collection devices. Although specific embodiments are illustrated and described herein, it will be appreciated by those of ordinary skill in the art that any arrangement which is calculated to achieve the same purpose can be substituted for the specific embodiments shown. This specification is intended to cover any adaptations or variations of embodiments. In particular, one of skill in the art will appreciate that the names, terminology, or electrical values listed are not intended to limit embodiments. Furthermore, additional apparatus can be added to the components, functions can be rearranged among components, and new components corresponding to future enhancements and future physical devices used in embodiments can be introduced without departing from the scope of the invention. The terminology used in this application is intended to include all embodiments and alternatives which provide the same functionality as described herein.

The invention claimed is:

1. A system for collecting water from air, the system comprising:
   a casing comprising:
      an air input port,
      an air output port, and
      a collection container,
   a voltage supply,
   a plurality of electrically chargeable elements electrically connected to the voltage supply and configured to emit an electrostatic field,
   at least one cooling element,
   at least one humidity sensor,
   at least one temperature sensor, and
   control circuitry configured to:
      receive measurement data from the at least one humidity sensor and the at least one temperature sensor, and
      adjust the electrostatic field to a selected value from among a gradient of electric field values and adjust the at least one cooling element based on the measurement data to promote condensation.

2. The system of claim 1, wherein the casing comprises an inner shell and an outer shell and wherein the plurality of electrically chargeable elements are configured within the inner shell.

3. The system of claim 2, wherein the inner shell is thermally conductive.

4. The system of claim 2, wherein the outer shell comprises an insulative thermoplastic material.

5. The system of claim 1, further comprising one or more grounding components configured to direct the electrostatic fields of each of the electrically chargeable elements.

6. The system of claim 5, wherein the one or more grounding components comprise a grounding rod.

7. The system of claim 5, wherein the one or more grounding components comprise a plurality of grounding plates, each configured proximate to one of the electrically chargeable elements.

8. The system of claim 5, wherein the one or more grounding components are configured such that the electric fields are configured to induce flow of water toward the grounding components.

9. The system of claim 1, wherein each of the electrically chargeable elements comprise a first plate and a collector configured as a second plate connected to the first plate.

10. The system of claim 9, wherein each of the collectors comprise one or more pointed tips at an edge of the second plate, wherein the one or more pointed tips are configured to coalesce water droplets.

11. The system of claim 10, wherein the second plates comprise one or more grooves configured to direct water toward the one or more tips.

12. The system of claim 1, further comprising a fan air input port configured to facilitate air movement into the casing.

13. The system of claim 1, wherein the cooling elements are fans or thermoelectric coolers.

14. The system of claim 1, wherein the at least one temperature sensor and at least one humidity sensor are configured to sense the temperature and humidity, respectively, of air entering the air input port.

15. The system of claim 14, wherein adjusting the electrostatic field and the at least one cooling element based on the measurement data comprises calculating a dew point temperature of the air entering the input port.

16. The system of claim 15, wherein adjusting the electrostatic field and the at least one cooling element based on the measurement data comprises adjusting the at least one cooling element to provide a temperature that is below the calculated dew point temperature.

17. The system of claim 15, wherein adjusting the electrostatic field and the at least one cooling element based on the measurement data comprises adjusting the electrostatic field to change the dew point temperature inside the casing.

18. The system of claim 1, further comprising one or more pressure sensors configured to measure pressure within the casing.

19. The system of claim 18, further comprising one or more fans, wherein the control circuitry is configured to adjust the one or more fans based on the measured pressure within the casing.

* * * * *